(12) United States Patent
Tanaka et al.

(10) Patent No.: US 11,098,780 B2
(45) Date of Patent: Aug. 24, 2021

(54) SUSPENSION

(71) Applicant: Showa Corporation, Gyoda (JP)

(72) Inventors: Katsushi Tanaka, Fukuroi (JP); Kojiro Yoshida, Fukuroi (JP)

(73) Assignee: Showa Corporation, Gyoda (JP)

( * ) Notice: Subject to any disclaimer, the term of this patent is extended or adjusted under 35 U.S.C. 154(b) by 120 days.

(21) Appl. No.: 16/521,103

(22) Filed: Jul. 24, 2019

(65) Prior Publication Data

US 2019/0346005 A1 Nov. 14, 2019

Related U.S. Application Data

(63) Continuation of application No. PCT/JP2017/028586, filed on Aug. 7, 2017, which is
(Continued)

(30) Foreign Application Priority Data

Mar. 7, 2017 (JP) .............................. JP2017-042791

(51) Int. Cl.
*F16F 9/05* (2006.01)
*B60G 15/14* (2006.01)
(Continued)

(52) U.S. Cl.
CPC .............. *F16F 9/057* (2013.01); *B60G 15/14* (2013.01); *F16F 9/3415* (2013.01); *F16F 9/36* (2013.01); *F16F 9/49* (2013.01); *B62K 25/283* (2013.01)

(58) Field of Classification Search
CPC .......... F16F 9/057; F16F 9/084; F16F 9/3415; F16F 9/36; F16F 9/49; B60G 15/14; B62K 25/283
(Continued)

(56) References Cited

U.S. PATENT DOCUMENTS 3,399,882 A * 9/1968 Hausmann ........... B60G 17/048
267/64.21
3,653,651 A 4/1972 Allinquant et al.
(Continued)

FOREIGN PATENT DOCUMENTS

DE 102012001670 A1 8/2013
EP 2290259 A2 3/2011
(Continued)

OTHER PUBLICATIONS

International Search Report dated Oct. 3, 2017 for the corresponding International Patent Application No. PCT/JP2017/028586.
(Continued)

*Primary Examiner* — Thomas W Irvin
(74) *Attorney, Agent, or Firm* — Leason Ellis LLP (57) ABSTRACT

A suspension includes: a cylinder; a piston rod including a piston provided at one end-side, and inserted in the cylinder together with the piston; an outer tube part opened at the one end-side, a position of which relative to the piston rod is fixed at the other end-side, and configured to receive therein at least a part of the cylinder; and a tubular rolling diaphragm having one end disposed at the cylinder and the other end fixed to the outer tube part, and configured to roll in conjunction with displacement of the piston rod with respect to the cylinder. The rolling diaphragm becomes convex toward the other end-side of the outer tube part and is accommodated in the outer tube part, upon contraction of the suspension.

12 Claims, 6 Drawing Sheets

Related U.S. Application Data a continuation-in-part of application No. PCT/JP2017/014001, filed on Apr. 3, 2017.

(51) Int. Cl.
*F16F 9/34* (2006.01)
*F16F 9/36* (2006.01)
*F16F 9/49* (2006.01)
*B62K 25/28* (2006.01)

(58) Field of Classification Search
USPC .......................................................... 267/122
See application file for complete search history.

(56) References Cited

U.S. PATENT DOCUMENTS

| | | | | |
|---|---|---|---|---|
| 4,022,448 A * | 5/1977 | Reeder | ................... | F16F 9/084 267/226 |
| 5,996,980 A * | 12/1999 | Frey | ................... | F16F 9/38 267/64.27 |
| 6,536,749 B1 * | 3/2003 | Luhmann | ............... | B60G 15/12 267/220 |
| 6,817,597 B1 * | 11/2004 | Thurow | ............... | B60G 11/265 267/122 |
| 7,802,776 B2 * | 9/2010 | Behmenburg | ..... | B60G 17/0521 267/64.24 |
| 8,006,963 B2 * | 8/2011 | Gleu | ................... | F16F 9/055 267/64.25 |
| 8,025,272 B2 * | 9/2011 | Schallmeier | ............ | F16F 9/465 267/64.21 |
| 8,511,652 B2 * | 8/2013 | Moulik | ................... | B60G 15/14 267/64.21 |
| 9,290,073 B2 * | 3/2016 | Bounds | ................... | B60G 15/12 |
| 9,809,075 B2 * | 11/2017 | Bounds | ................... | F16F 9/049 |
| 9,932,084 B2 * | 4/2018 | Awasa | ................... | F16F 13/002 |
| 9,969,458 B2 * | 5/2018 | Yoshida | ................ | F16F 9/0472 |
| 10,161,472 B2 * | 12/2018 | Hechenblaikner | .......................... | B29C 66/73921 |
| 2011/0115140 A1 * | 5/2011 | Moulik | ............... | B60G 17/0521 267/64.23 |
| 2016/0280316 A1 | 9/2016 | Yoshida | | |

FOREIGN PATENT DOCUMENTS

| | | |
|---|---|---|
| GB | 833027 A | 4/1960 |
| JP | 61-041608-UM Y2 | 11/1986 |
| JP | 05-004590-UM Y2 | 2/1993 |
| JP | 2003-511639 T | 3/2003 |
| JP | 2006-327296 A | 12/2006 |
| JP | 5131594 B2 | 1/2013 |
| JP | 2016-183761 A | 10/2016 |

OTHER PUBLICATIONS

Extended European Search Report dated Nov. 27, 2020 for the corresponding European Patent Application No. 17899668.2.

* cited by examiner

SUSPENSION

CROSS-REFERENCE TO RELATED APPLICATION(S)

This application is a continuation of a PCT Application No. PCT/JP2017/028586, which was filed on Aug. 7, 2017 based on Japanese Patent Application No. 2017-042791 filed on Mar. 7, 2017 and PCT Application No. PCT/JP2017/014001 filed on Apr. 3, 2017, the contents of which are incorporated herein by reference.

TECHNICAL FIELD

An exemplary embodiment of the present invention relates to a suspension.

BACKGROUND ART

In the prior art, a vehicle (for example, an automatic two-wheeled vehicle) is provided with a suspension, from standpoints of a ride quality and the like. PTL 1 discloses a suspension including a diaphragm configured to form an air chamber around a piston rod and a tubular cover configured to cover an outer periphery of the diaphragm.

In the meantime, PTL 2 discloses an air suspension device including a rubber tube configured to form an air chamber and a tubular extensible cover coupled to an outer periphery of the rubber tube.

Also, PTL 3 discloses a fluid suspension where an opening end of a second cylindrical member is inserted in a first cylindrical member and a diaphragm is disposed between an opening end of the first cylindrical member and the opening end of the second cylindrical member. PTL 4 discloses an air suspension device where an opening end of a tubular air piston is inserted in a tubular air chamber and a diaphragm is attached between an outer periphery of an air piston and an inner periphery of a guide tube extended to an end portion of the air chamber. PTL 5 discloses a vehicle height adjusting device including a rolling diaphragm fixed to an outer tube and a cylinder so as to form an air chamber above the cylinder.

[PTL 1] JP-A-2016-183761 (published on Oct. 20, 2016)
[PTL 2] Japanese Patent No. 5,131,594 (issued on Jan. 30, 2013)
[PTL 3] JP-U-H05-004590 (published on Feb. 4, 1993)
[PTL 4] JP-A-2006-327296 (published on Dec. 7, 2006)
[PTL 5] JP-U-S61-041608 (published on Nov. 27, 1986)

Generally, in the suspension where a piston is reciprocally moved in the cylinder, heat is generated with the reciprocal movement of the piston. Like the invention disclosed in PTL 2, when the extensible cover constantly covering the cylinder is attached, heat dissipation efficiency of the cylinder is lowered.

In the invention disclosed in PTL 1, since a folded-back part of the diaphragm forming the air chamber is convex toward a vehicle body-side, dust such as mud and the like infiltrated from the above are involved.

Also, in the inventions disclosed in PTL 3 to 5, the cylinder for generating a damping force is disposed at an axle-side. However, when the inventions are applied to a rear cushion of a vehicle for motocross, since the cylinder for generating a damping force is disposed at the vehicle body-side, it is necessary to reverse the vehicle body-side and the axle-side. In the inventions, when the vehicle body-side and the axle-side are reversed, since the folded-back part of the diaphragm becomes convex toward the vehicle body-side, dust such as mud and the like infiltrated from the above are involved.

An aspect of the present invention is to implement a suspension capable of preventing infiltration of dust and improving heat dissipation efficiency of a cylinder.

SUMMARY OF INVENTION

In order to achieve the above object, a suspension according to an aspect of the present invention is a suspension including: a cylinder; a piston rod including a piston provided at one end-side, and inserted in the cylinder together with the piston; an outer tube part opened at the one end-side, a position of which relative to the piston rod is fixed at the other end-side, and configured to receive therein at least a part of the cylinder; and a tubular rolling diaphragm having one end disposed at the cylinder and the other end fixed to the outer tube part, and configured to roll in conjunction with displacement of the piston rod with respect to the cylinder, wherein the rolling diaphragm becomes convex toward the other end-side of the outer tube part and is accommodated in the outer tube part, upon contraction of the suspension.

Advantageous Effects of Invention

According to the aspect of the present invention, it is possible to implement the suspension capable of preventing infiltration of dust and improving heat dissipation efficiency of the cylinder.

DESCRIPTION OF EMBODIMENTS

Exemplary Embodiment 11

Hereinafter, an exemplary embodiment of the present invention will be described in detail with reference to FIGS. 1 and 2.

(Configuration of Suspension 1)

Figure 1:
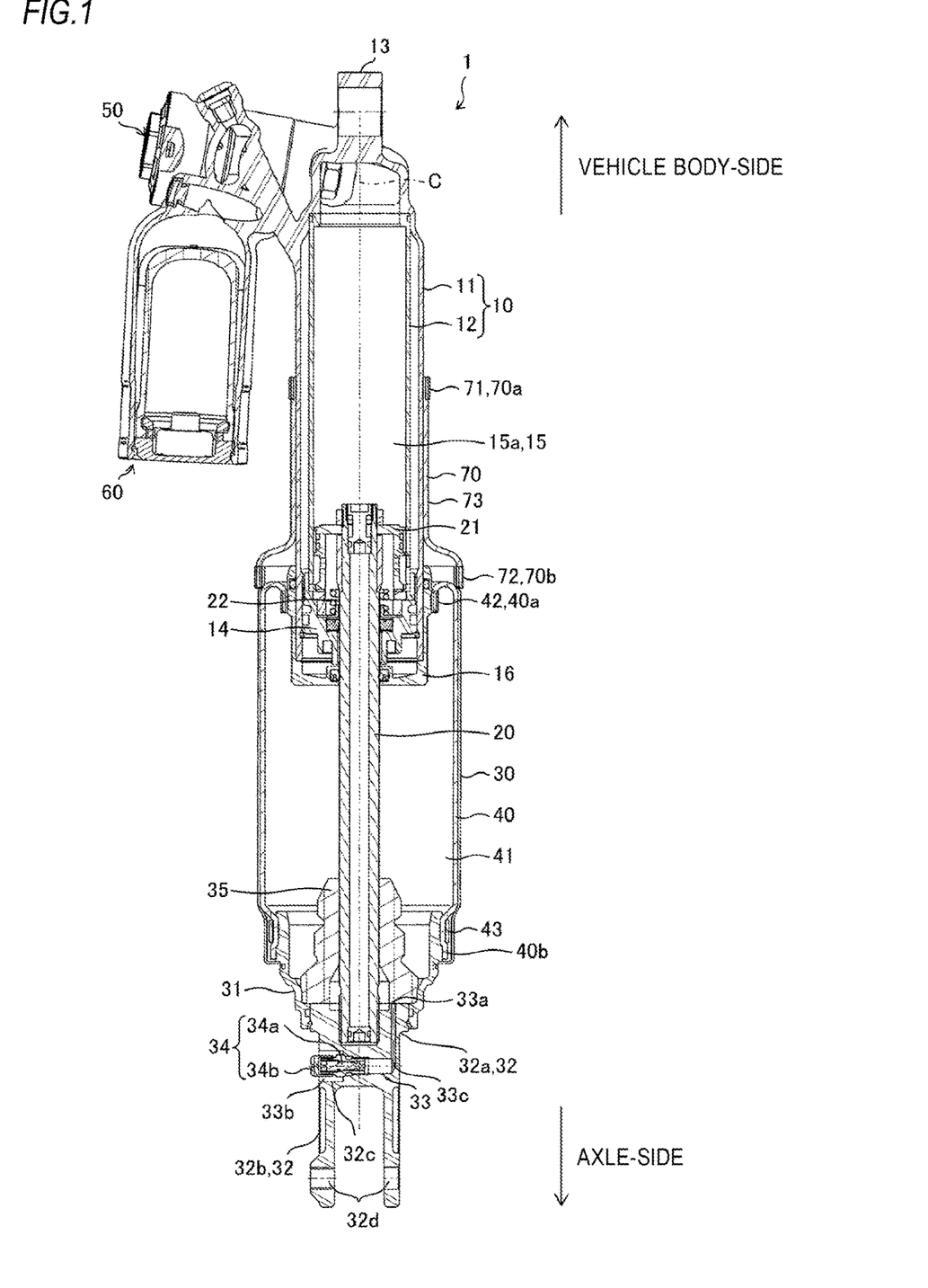
FIG. 1 is a sectional view of a suspension according to an exemplary embodiment 1 of the present invention, depicting a state upon maximum extension thereof.

FIG. 1 is a sectional view of a suspension 1 according to an exemplary embodiment 1 of the present invention, depicting a state upon maximum extension thereof. FIG. 2 is a sectional view of the suspension 1 according to the exemplary embodiment 1 of the present invention, depicting a state upon maximum compression thereof. More specifically, FIGS. 1 and 2 are sectional views of the suspension 1 taken along a plane including a central axis C of a piston rod 20. Meanwhile, in the specification, "upon maximum compression" means the time when an axial length of the suspension 1 becomes minimum.

The suspension 1 is provided to a vehicle, for example, an automatic two-wheeled vehicle. The suspension 1 has a vehicle body-side (one end-side) and an axle-side (the other end-side). In the specification, a direction from the vehicle body-side toward the axle-side (or an opposite direction thereto) is referred to as "axial direction". As shown in FIGS. 1 and 2, the suspension 1 includes a cylinder 10, a piston rod 20, an outer tube part 30, a first diaphragm 40, a damping force generation unit 50 (damping force generation device), a sub-tank 60, and a second diaphragm (rolling diaphragm) 70.

The cylinder 10 is a tubular member extending in the axial direction of the suspension 1, and includes an attachment member 13 configured to join the suspension 1 to a vehicle body and provided at an end portion of the vehicle body-side. The cylinder 10 is configured by a double tube of an outer tube 11 and an inner tube 12.

An end portion of the outer tube 11 at the vehicle body-side is closed and is integrally formed with the attachment member 13, for example. A rod guide 14 through which the piston rod 20 passes is fixed to an end portion of the outer tube 11 at the axle-side. Specifically, the rod guide 14 is liquid-tightly fixed to an inner periphery of the end portion of the outer tube 11 at the axle-side.

An outer periphery of the outer tube 11 at the axle-side is provided with a bottomed cylindrical end member 16 opened at the vehicle body-side and having a bottom at the axle-side. The end member 16 is airtightly fixed to an outer periphery of the outer tube 11. The bottom of the end member 16 is formed with an opening through which the piston rod 20 passes.

An end portion of the inner tube 12 at the vehicle body-side is in contact with an inner surface of the end portion of the outer tube 11 at the vehicle body-side. An end portion of the inner tube 12 at the axle-side is in contact with the rod guide 14. In the inner tube 12, an oil chamber 15 having operating oil filled therein is formed.

The piston rod 20 is a rod-shaped member extending in the axial direction of the suspension 1 and has a piston 21 provided at the vehicle body-side. Also, the piston rod 20 is inserted in the cylinder 10 together with the piston 21. At this time, the piston rod 20 is liquid-tightly slid relative to each of the rod guide 14 and the end member 16.

The piston 21 is configured to slide on an inner surface of the inner tube 12 of the cylinder 10. The oil chamber 15 in the inner tube 12 is divided into an oil chamber 15a (refer to FIG. 1) at the vehicle body-side and an oil chamber 15b (refer to FIG. 2) at the axle-side by the piston 21. Also, a rebound spring 22 configured to restrain extension stroke of the suspension 1 is provided around the piston rod 20 and between the piston 21 and the rod guide 14.

The outer tube part 30 is a tubular member extending in the axial direction of the suspension 1. The outer tube part 30 is configured so that at least a part of the cylinder 10 is to be received therein from the vehicle body-side. A member 31 is provided at the axle-side of the outer tube part 30. The member 31 is a tubular member of which both ends at the vehicle body-side and the axle-side are opened. An attachment member 32 for coupling the suspension 1 to an axle is airtightly provided to the opening of the member 31 at the axle-side.

The attachment member 32 has a fixing part 32a and an attachment part 32b. The fixing part 32a has a concave portion of which an inner peripheral surface is formed with a thread groove. The thread groove is threadably engaged with a thread groove formed on an end portion of the piston rod 20 at the axle-side. Since the outer tube part 30 is fixed to the fixing part 32a via the member 31, a position of the outer tube part 30 relative to the piston rod 20 is fixed at the axle-side.

The attachment part 32b is configured by two flat plate-shaped members facing each other, for example. The axle is enabled to pass through attachment holes 32d formed in each of the flat plate-shaped members, so that the suspension 1 is coupled to the axle. In the meantime, the configuration of the attachment part 32b is not limited to the above example.

Also, the attachment member 32 is provided with a valve part 34 for filling a gas in an air chamber 41 inside the first diaphragm 40. The air chamber 41 is configured to communicate with an external space through a first opening 33a formed in a surface of the attachment member 32 at the vehicle body-side, a gas passage 33 and a second opening 33b formed in a side surface of the attachment member 32. The valve part 34 is provided at the second opening 33b, and is configured to prevent the gas filled in the air chamber 41 from being leaked to an outside from the second opening 33b. The gas passage 33 is a through-hole formed in the attachment member 32, and is an L-shaped passage having a bent part 33c.

The valve part 34 has a valve body 34a and a valve cap 34b. The valve body 34a is inserted in the gas passage 33 from the second opening 33b. A side surface of the attachment member 32 is provided with an annular groove portion 32c surrounding the second opening 33b. An inner peripheral surface of the groove portion 32c is formed with a thread groove that is to be threadably engaged with a thread groove formed on an outer peripheral surface of the valve cap 34b.

Also, the member 31 is provided therein with a tubular stopper member 35 for restraining a compression stroke of the suspension 1. An end portion of the stopper member 35 at the axle-side is fitted in a concave portion formed in the member 31, for example. The stopper member 35 is formed of urethane, urethane foam or elastic material such as rubber, for example. Upon maximum compression of the suspension 1, movement of the end member 16 toward the axle-side is restrained by elastic deformation of the stopper member 35.

The first diaphragm 40 is a tubular member for forming the air chamber 41 around at least the piston rod 20, and is disposed in the outer tube part 30. The first diaphragm 40 is formed of a flexible rubber or the like.

One end 40a of the first diaphragm 40 is airtightly fixed to the end member 16 by a first swaging band 42, for example. Also, the other end 40b of the first diaphragm 40 is airtightly fixed to an outer peripheral surface of the member 31 by a second swaging band 43. The first swaging band 42 and the second swaging band 43 are an annular or C-shaped member, for example, respectively.

In the air chamber 41, a gas (for example, air) of a pressure within a predetermined range is filled. The gas filled in the air chamber 41 functions as an air spring that is to generate a reactive force when the suspension 1 is compressed.

In FIG. 1, the first opening 33a is covered by the stopper member 35. When the stopper member 35 is formed of a material having voids, the gas to be filled from the valve part 34 passes through the stopper member 35 and fills the air chamber 41. In contrast, when the stopper member 35 is formed of a material with no void, the gas to be filled from the valve part 34 fills the air chamber 41 through a flow path (not shown).

The damping force generation unit 50 is configured to generate a damping force with flow of the operating oil filled in the cylinder 10. The damping force generation unit 50 is configured to communicate with the oil chamber 15a at the vehicle body-side and the oil chamber 15b at the axle-side.

The sub-tank 60 is a container configured to compensate for the operating oil equivalent to an amount of change in volume of the cylinder 10, in conjunction with displacement of the piston rod 20 with respect to the cylinder 10. The sub-tank 60 is configured to communicate with the oil chamber 15a and the oil chamber 15b via the damping force generation unit 50.

The second diaphragm 70 is a tubular diaphragm configured to roll in conjunction with displacement of the piston rod 20 with respect to the cylinder 10. The second diaphragm 70 is configured to suppress dust and the like from being infiltrated into the outer tube part 30, thereby protecting the first diaphragm 40. Specifically, the second diaphragm 70 is a member that is not involved in formation of the air chamber 41 and is different from the first diaphragm 40 for forming the air chamber 41, and is disposed closer to the vehicle body-side than the first diaphragm 40. For this reason, it is possible to prevent a situation where the first diaphragm 40 is damaged by dust such as mud and the function of the air chamber 41 as the air spring is damaged.

Figure 2:
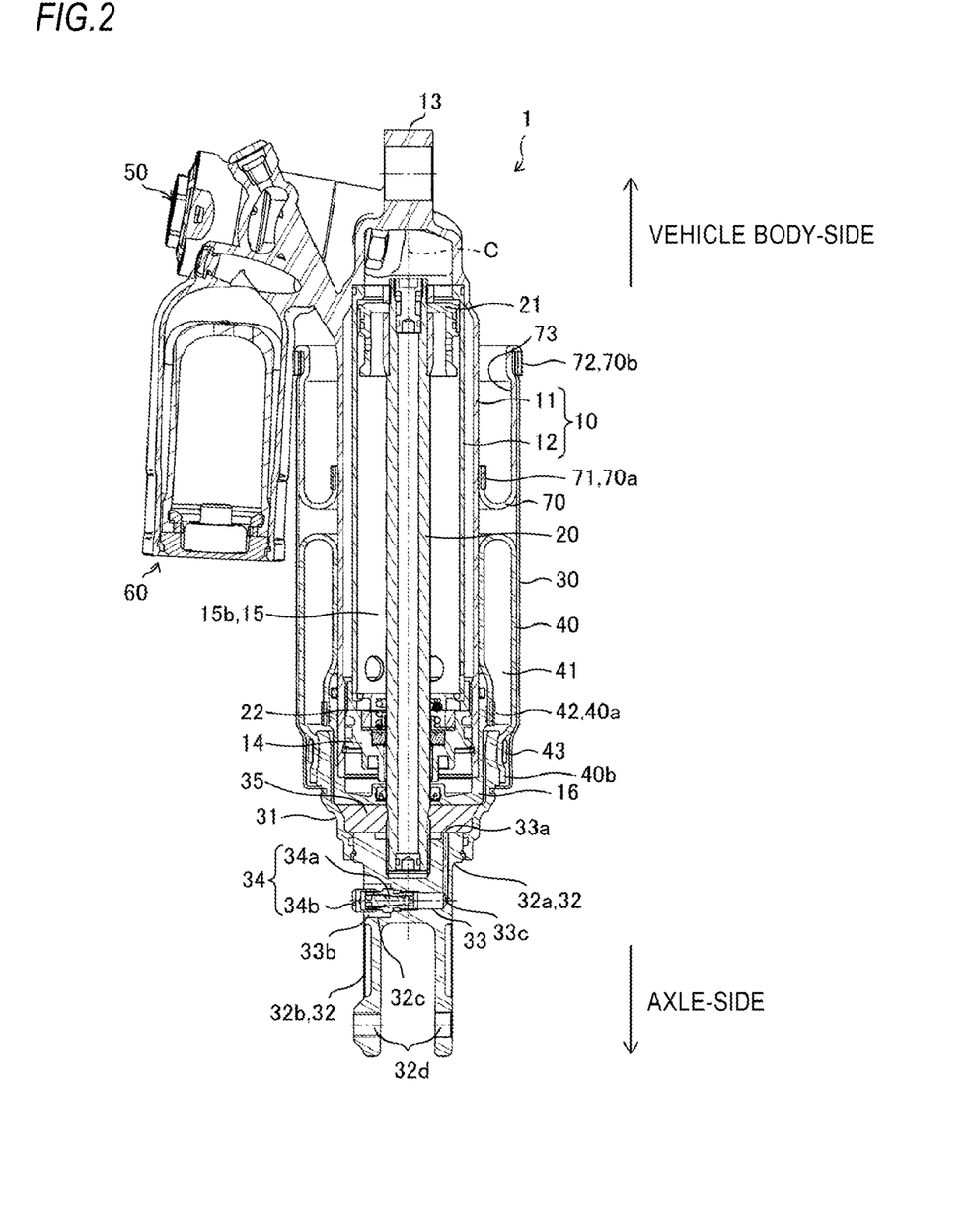
FIG. 2 is a sectional view of the suspension according to the exemplary embodiment 1 of the present invention, depicting a state upon maximum compression thereof.

As shown in FIG. 2, when the suspension 1 contracts, one end 70a of the second diaphragm 70 is moved into the outer tube part 30. In this state, the second diaphragm 70 becomes convex toward the axle-side (the vertically lower side) of the outer tube part 30 and is accommodated in the outer tube part 30.

When the suspension 1 extends, one end 70a of the second diaphragm 70 is moved to an outside of the outer tube part 30, in conjunction with movement of the cylinder 10 toward the vehicle body-side. In conjunction with the movement, while a surface 73, which faces toward the vehicle body-side, of surfaces of the second diaphragm 70 having the convex shape keeps facing toward an opposite side (an external space-side) to the outer peripheral surface of the cylinder 10, the second diaphragm 70 rolls (refer to FIG. 1). For this reason, even when the dust is infiltrated into the convex shape, the dust is discharged to the outside upon the extension, so that a bad influence on the rolling of the second diaphragm 70 is prevented.

The second diaphragm 70 is formed of a material such as flexible rubber or the like, like the first diaphragm 40. However, the second diaphragm 70 may also be formed of a material such as fabric, other than the rubber. Also, the second diaphragm 70 preferably includes a material having high heat conductivity. As the material having high heat conductivity, silicone rubber, glass fiber and the like may be exemplified.

One end 70a of the second diaphragm 70 is disposed at a position, at which the vehicle body-side of the cylinder 10 is exposed to an exterior air, of the outer peripheral surface of the cylinder 10 (a position, which is distant from an end portion of the cylinder 10 at the vehicle body-side toward the axle-side by a predetermined distance, for example, an axially central part of the cylinder 10). In the exemplary embodiment 1, one end 70a is fixed to the outer peripheral surface of the cylinder 10 by a third swaging band 71. Also, the other end 70b of the second diaphragm 70 is fixed to an end portion of the outer tube part 30 at the vehicle body-side by a fourth swaging band 72.

(Operations of Suspension 1 During Compression Stroke)

During the compression stroke, when the suspension 1 is gradually compressed from the state upon maximum extension shown in FIG. 1, the first diaphragm 40 rolls toward the vehicle body-side along the outer peripheral surface of the cylinder 10, as shown in FIG. 2. With the rolling, the volume of the air chamber 41 decreases and the reactive force by the gas filled in the air chamber 41 increases. Also, with the compression of the suspension 1, the second diaphragm 70 rolls toward the axle-side along the inner peripheral surface of the outer tube part 30, as shown in FIG. 2. At this time, the other end 70b of the second diaphragm 70 is moved toward the vehicle body-side beyond the axial position of one end 70a. Like this, the second diaphragm 70 is different from a member such as bellows and operates without any problem even when the position of one end 70a and the position of the other end 70b are reversed in the axial direction of the suspension 1.

Also, during the compression stroke, as the piston 21 is moved in the inner tube 12, the operating oil flows from the oil chamber 15a to the damping force generation unit 50, thereby generating the damping force. Thereafter, the operating oil flows from the damping force generation unit 50 to the oil chamber 15b. However, the operating oil equivalent to the volume of the piston rod 20 inserted in the cylinder 10, i.e., the operating oil equivalent to the amount of change in the volume of the cylinder 10 flows from the damping force generation unit 50 to the sub-tank 60.

(Operations of Suspension 1 During Extension Stroke)

During the extension stroke, when the suspension 1 is gradually extended from the state upon maximum compression shown in FIG. 2, the first diaphragm 40 rolls toward the axle-side along the outer peripheral surface of the cylinder 10, as shown in FIG. 1. With the rolling, the volume of the air chamber 41 increases and the reactive force by the gas filled in the air chamber 41 decreases. Also, with the extension of the suspension 1, the second diaphragm 70 rolls toward the vehicle body-side along the inner peripheral surface of the outer tube part 30, as shown in FIG. 1. At this time, the other end 70b of the second diaphragm 70 is moved toward the axle-side beyond the axial position of one end 70a.

Also, during the extension stroke, as the piston 21 is moved in the inner tube 12, the operating oil flows from the oil chamber 15b to the damping force generation unit 50, thereby generating a damping force. Thereafter, the operating oil flows from the damping force generation unit 50 to the oil chamber 15a. Also, the operating oil equivalent to the volume of the piston rod 20 retreated from the cylinder 10, i.e., the operating oil equivalent to the amount of change in the volume of the cylinder 10 is supplied from the sub-tank 60 to the oil chamber 15a.

(Effects of Suspension 1)

In the suspension of the prior art having the bellows-shaped cover for protecting the cylinder, it is necessary to dispose an end portion of the cover at the vehicle body-side to an end portion of the cylinder at the vehicle body-side so that an end portion of the cover at the axle-side and the end portion thereof at the vehicle body-side are not to collide with each other upon the maximum compression. According to this configuration, since the cylinder is substantially entirely covered by the cover, the heat dissipation performance is lowered.

As described above, the suspension 1 includes the cylinder 10, the piston rod 20 having the piston 21 provided at the vehicle body-side and inserted in the cylinder 10 together with the piston 21, the outer tube part 30 opened at the vehicle body-side, a position of which relative to the piston rod 20 is fixed at the axle-side, and configured to receive therein at least a part of the cylinder 10, and the tubular second diaphragm 70 having one end 70a disposed at the cylinder 10 and the other end 70b fixed to the outer tube part 30 and configured to roll in conjunction with displacement of the piston rod 20 with respect to the cylinder 10. One end 70a of the second diaphragm 70 is disposed at the position at which the vehicle body-side of the cylinder 10 is exposed to the exterior air.

In the suspension 1, since the second diaphragm 70 is configured to roll, even though one end 70a is disposed at the axially central part of the cylinder 10, the other end 70b does not collide with one end 70a and the other end 70b can be located closer to the vehicle body-side than one end 70a upon the maximum compression. One end 70a is disposed at the axially central part of the cylinder 10, so that the outer peripheral surface of the cylinder 10, which is closer to the vehicle body-side than one end 70a, can be always exposed and the heat dissipation performance of the cylinder 10 can be thus improved.

In the suspension 1, since the second diaphragm 70 is disposed to block an entry of an space formed between the outer peripheral surface of the cylinder 10 and the outer tube part 30, it is possible to prevent the dust and the like from being infiltrated into the space. Also, the second diaphragm 70 is configured to roll in conjunction with displacement of the piston rod 20 with respect to the cylinder 10, so that it is possible to compensate for a change in distance between one end 70a and the other end 70b of the second diaphragm 70, which is caused due to the displacement. By this operation, the second diaphragm 70 can prevent the infiltration of the dust and the like into the space while coping with the displacement of the piston rod 20.

Also, it is possible to remove mud and the like attached to the surface of the second diaphragm 70 by the rolling of the second diaphragm 70.

Also, for example, when a shock absorber disclosed in PTL 5 is vertically inverted, a rolling diaphragm provided to the shock absorber becomes convex upward upon extension of the shock absorber. In this state, a surface (referred to as 'outer surface') of the rolling diaphragm exposed to the outside comes in contact with the outer peripheral surface of the cylinder upon contraction of the shock absorber. For this reason, the dust such as mud attached to the outer surface upon extension may be involved between the rolling diaphragm and the outer peripheral surface of the cylinder upon contraction, which may have a bad influence on the shock absorber.

In contrast, according to the suspension 1, upon the extension, the second diaphragm 70 covers the outer tube 11 of the cylinder 10 in a state where the surface 73 of the second diaphragm 70 faces toward the external space (refer to FIG. 1). Upon the contraction, the second diaphragm 70 becomes convex toward the axle-side and is accommodated in the outer tube part 30. For this reason, the second diaphragm 70 is accommodated in the outer tube part 30 in a state where the surface 73 keeps facing toward the external space without being inverted. For this reason, the second diaphragm 70 does not allow the dust such as mud and the like to be involved upon the contraction, unlike the shock absorber disclosed in PTL 5. This configuration is particularly useful when the suspension 1 is adopted for a vehicle for motocross.

Also, the suspension 1 further includes the first diaphragm 40. The first diaphragm 40 has one end 40a fixed to the cylinder 10 and the other end 40b fixed to the suspension 1 at the axle-side, and is configured to form the air chamber 41 around at least the piston rod 20. Also, the first diaphragm 40 is disposed in the outer tube part 30.

Therefore, the suspension 1 can buffer the shock applied to the suspension 1 by the air chamber 41 formed by the first diaphragm 40. Also, it is possible to protect the first diaphragm 40 forming the air chamber 41 against the dust and the like by the outer tube part 30 and the second diaphragm 70.

Also, since the second diaphragm 70 of the suspension 1 includes the material with heat dissipation, it is possible to further improve the heat dissipation efficiency of the cylinder 10.

Also, according to the suspension 1, the operating oil is filled in the cylinder 10 and the damping force generation unit 50 configured to generate the damping force with the flow of the operating oil is further provided. For this reason, the suspension 1 can more efficiently buffer the shock from the outside.

Also, the suspension 1 further includes the sub-tank 60 configured to compensate for the operating oil equivalent to the amount of change in volume of the cylinder 10, which is caused in conjunction with the displacement of the piston rod 20 with respect to the cylinder 10. For this reason, the suspension 1 can compensate for the change in volume of the cylinder 10 resulting from the displacement of the piston rod 20, and prevent the hydraulic pressure in the cylinder 10 from being excessively changed in conjunction with the displacement. As a result, it is possible to stabilize the shock buffering ability of the suspension 1.

Exemplary Embodiment 2

Figure 4:
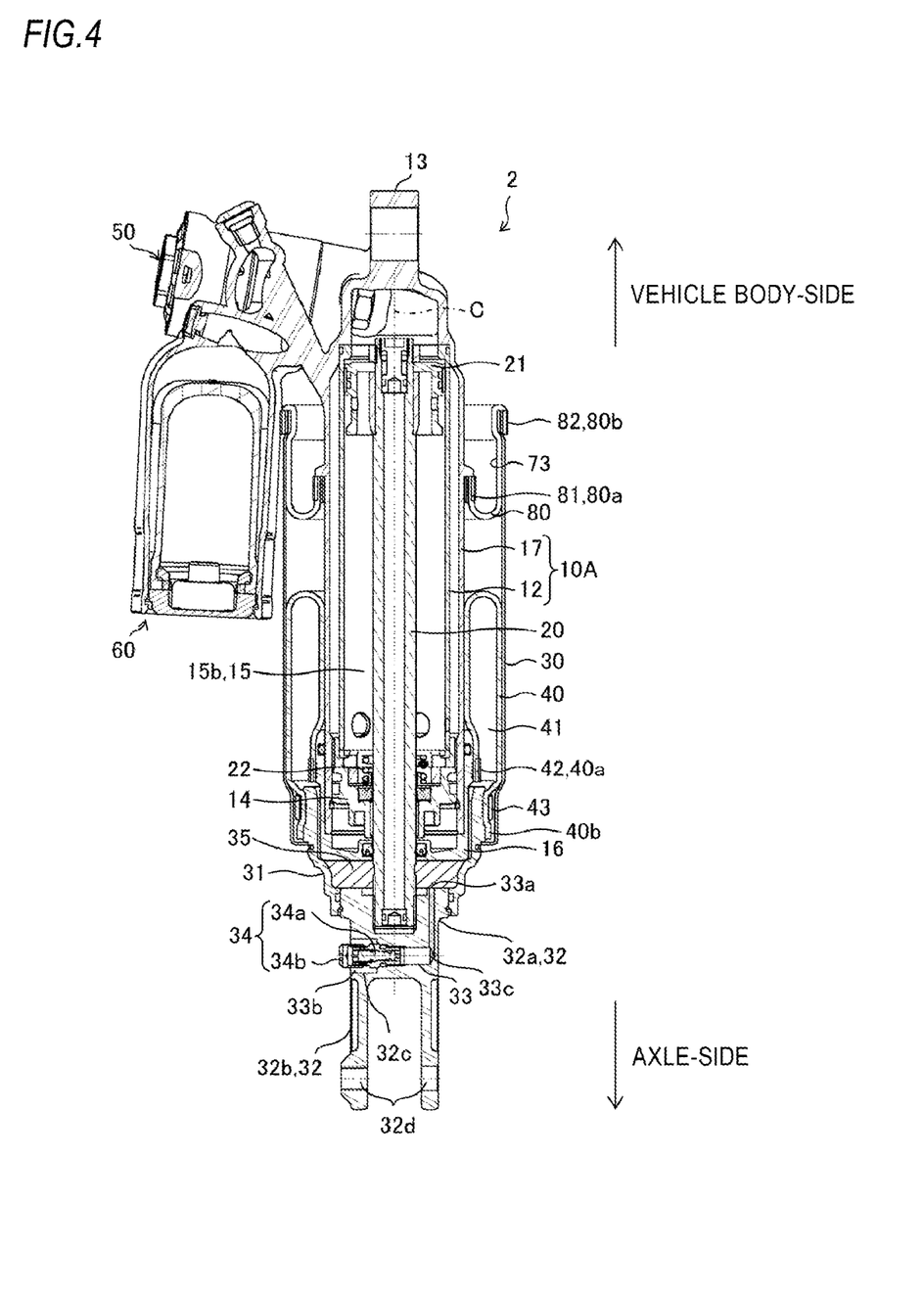
FIG. 4 is a sectional view of the suspension according to the exemplary embodiment 2 of the present invention, depicting a state upon maximum compression thereof.
Figure 5:
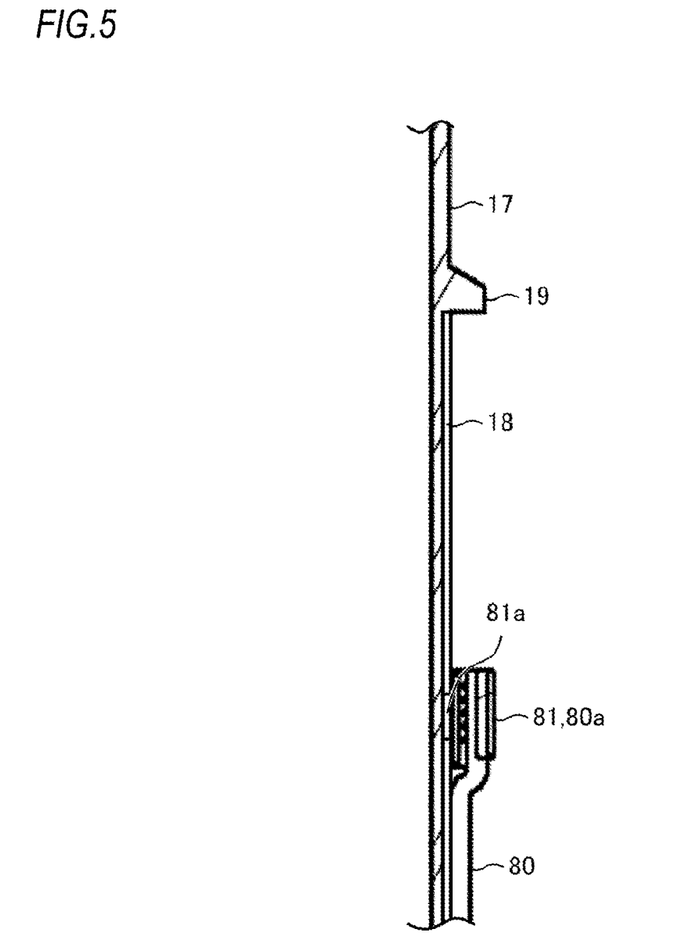
FIG. 5 is an enlarged view depicting a part of the suspension shown in FIG. 3.

A suspension 2 according to another exemplary embodiment of the present invention is described with reference to FIGS. 3 to 5. In the meantime, for convenience of descriptions, the members having the same functions as the members described in the exemplary embodiment 1 are denoted with the same reference numerals, and the descriptions thereof are omitted.

(Configuration of Suspension 2)

Figure 3:
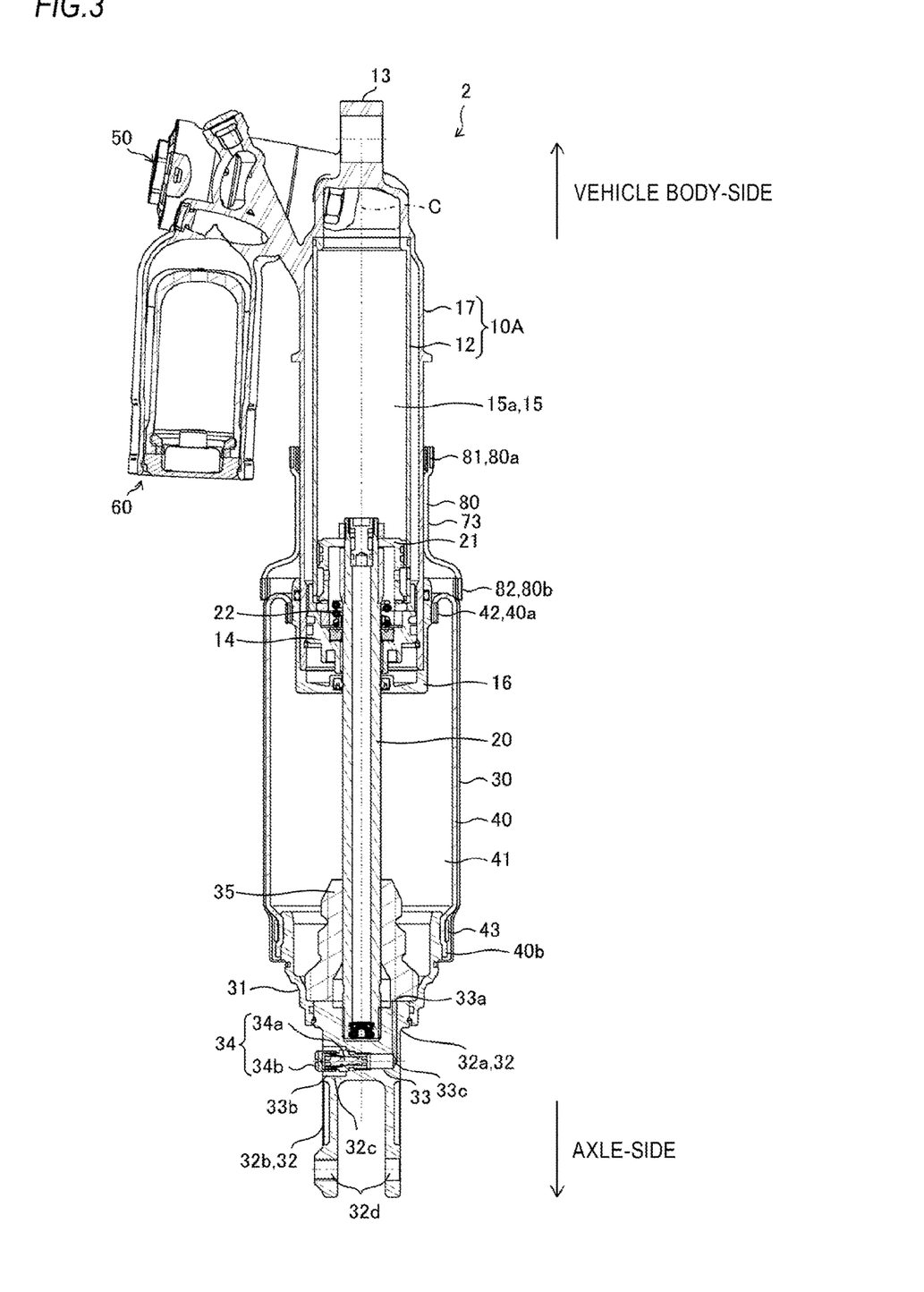
FIG. 3 is a sectional view of a suspension according to an exemplary embodiment 2 of the present invention, depicting a state upon maximum extension thereof.

FIG. 3 is a sectional view of the suspension 2 according to the exemplary embodiment 2, depicting a state upon maximum extension thereof. FIG. 4 is a sectional view of the suspension 2 according to the exemplary embodiment 2, depicting a state upon maximum compression thereof. FIG. 5 is an enlarged view depicting a part of the suspension 2 shown in FIG. 3. More specifically, FIGS. 3 and 4 are sectional views of the suspension 2 taken along a plane including the central axis C of the piston rod 20.

The suspension 2 is different from the suspension 1, in the following respect.

The suspension 2 includes a cylinder 10A, instead of the cylinder 10.

The suspension 2 includes a third diaphragm 80 (rolling diaphragm), instead of the second diaphragm 70.

The cylinder 10A includes an outer tube 17 and an inner tube 12. The outer tube 17 is different from the outer tube 11, in that a rail 18 and a stopper 19 are formed on an outer peripheral surface thereof. The rail 18 is a groove formed in a surface of the outer tube 17 in parallel with the axial direction of the suspension 2. The stopper 19 is a projection provided at an end portion of the rail 18 at the vehicle body-side.

The third diaphragm 80 is a tubular diaphragm similar to the second diaphragm 70. However, an axial length of the third diaphragm 80 is shorter than the second diaphragm 70.

In the exemplary embodiment 2, one end 80*a* of the third diaphragm 80 is disposed on the outer peripheral surface of the cylinder 10 via an engaging member 81. The engaging member 81 is an annular member and has a convex part 81*a* (refer to FIG. 5) to be engaged with the rail 18. In a state where the convex part 81*a* is engaged with the rail 18, the engaging member 81 is slid along the cylinder 10A, so that one end 80*a* is displaced with respect to the cylinder 10A. Also, the other end 80*b* of the third diaphragm 80 is fixed to the end portion of the outer tube part 30 at the vehicle body-side by a fifth swaging band 82.

The displacement of one end 80*a* toward the vehicle body-side is restrained by the stopper 19. Thereby, even in a state where one end 80*a* is most displaced toward the vehicle body-side, since a part of the cylinder 10A at the vehicle body-side is exposed to the exterior air, it is possible to keep the heat dissipation performance of the cylinder 10A.

In the meantime, the cylinder 10A may have a bush for sliding the engaging member 81, instead of the rail 18. In this case, the engaging member 81 is not required to have the convex part 81*a*.

(Operations of Suspension 2)

Upon the maximum extension of the suspension 2, one end 80*a* of the third diaphragm 80 is located at a terminal end of the rail 18 at the axle-side. During the compression stroke of the suspension 2, one end 80*a* is first displaced toward the vehicle body-side in conjunction with displacement of the outer tube part 30 with respect to the cylinder 10A. After one end 80*a* comes in contact with the stopper 19, the third diaphragm 80 rolls along the inner peripheral surface of the outer tube part 30. At this time, the other end 80*b* is moved toward the vehicle body-side beyond the axial position of one end 80*a*.

In the meantime, upon the maximum compression of the suspension 2, one end 80*a* is in contact with the stopper 19. During the extension stroke of the suspension 2, one end 80*a* is first displaced toward the axle-side in conjunction with displacement of the outer tube part 30 with respect to the cylinder 10A. After one end 80*a* reaches the terminal end of the rail 18 at the axle-side, the third diaphragm 80 rolls along the inner peripheral surface of the outer tube part 30. At this time, the other end 80*b* is moved toward the axle-side beyond the axial position of one end 80*a*.

In the meantime, the order of the rolling of the third diaphragm 80 and the displacement of one end 80*a* is not limited to the above example, and is determined depending on a coefficient of friction between the outer tube 17 and the engaging member 81 and a material of the third diaphragm 80.

(Effects of Suspension 2)

The suspension 2 of the exemplary embodiment 2 accomplishes following effects, in addition to the effects of the suspension 1.

In the suspension 2, one end 80*a* of the third diaphragm 80 is disposed to be displaceable with respect to the cylinder 10A, and is displaced toward the axle-side upon the extension of the suspension 2. For this reason, upon the extension of the suspension 2, an area of the cylinder 10A to be covered by the third diaphragm 80 is reduced, so that it is possible to further improve the heat dissipation efficiency of the cylinder 10A.

Also, according to the suspension 2, since one end 80*a* of the third diaphragm 80 can be displaced with respect to the cylinder 10A, it is possible to make the axial length of the third diaphragm 80 shorter than the second diaphragm 70.

Exemplary Embodiment 3

Another exemplary embodiment of the present invention is described.

Figure 6:
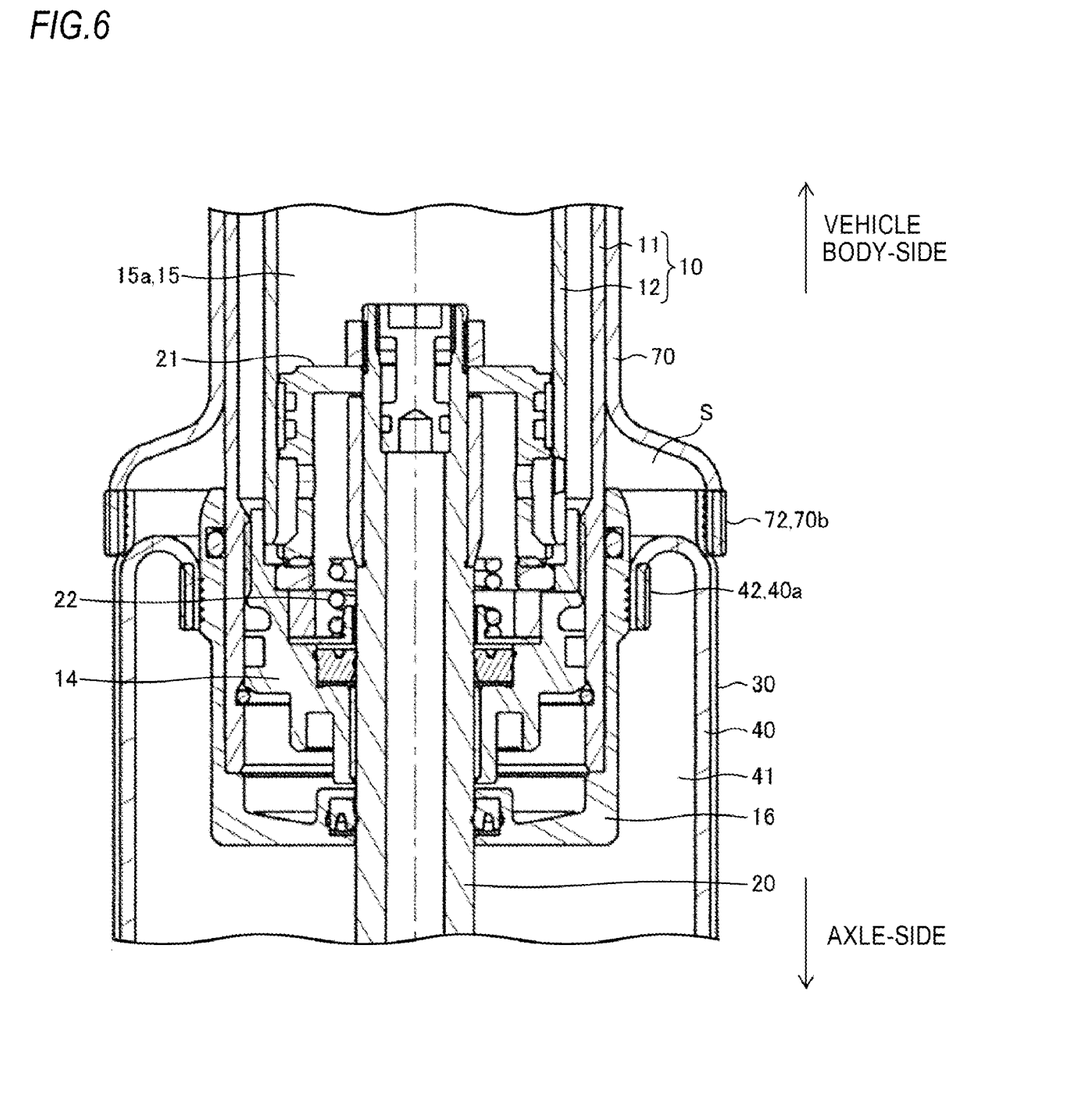
FIG. 6 is an enlarged view depicting a part of the suspension shown in FIG. 1.

FIG. 6 is an enlarged view depicting a part of the suspension 1 shown in FIG. 1. As shown in FIG. 6, the suspension 1 is formed with a space S surrounded by the outer tube part 30, the second diaphragm 70, the first diaphragm 40 and the cylinder 10. A pressure in the space S is preferably a negative pressure. When the pressure in the space S is a negative pressure, the second diaphragm 70 is pressed to the cylinder 10 by the atmospheric pressure. For this reason, upon the compression of the suspension 1, the second diaphragm 70 can easily roll in the outer tube part 30.

Also, a temperature of the suspension 1 increases as the extension and compression are repeated. When the suspension 1 becomes a high temperature, a gas in the space S is expanded, so that the second diaphragm 70 is likely to be radially expanded. When the space S is kept under negative pressure at room temperatures upon the maximum extension or upon the maximum compression, it is possible to suppress the expansion of the second diaphragm 70 even at high temperatures.

Alternatively, a heat transfer fluid having fluidity and high heat conductivity may be injected in the space S. As the heat transfer fluid, heat transfer grease and the like may be exemplified. The heat transfer fluid is injected in the space S, so that it is possible to further improve the heat dissipation efficiency of the cylinder 10.

Also, a change in volume of the space S is preferably small so that the second diaphragm 70 is not subjected to a shape change except the assumed change as the suspension 1 is extended and contracted (in other words, so that the shape change of the second diaphragm 70 is to be suppressed within a desired range). Specifically, the volume of the space S is preferably 80% or more of the maximum volume of the space S all the time.

In the suspensions 1, 2, the cylinder 10 is provided at the vehicle body-side and the piston rod 20 and the outer tube part 30 are provided at the axle-side. However, in a suspension according to an aspect of the present invention, the cylinder 10 may be provided at the axle-side and the piston rod 20 and the outer tube part 30 may be provided at the vehicle body-side. Even the suspension accomplishes the same effects as the suspensions 1, 2.

The suspensions 1, 2 include the sub-tank 60 configured to compensate for the operating oil equivalent to the amount of change in volume of the cylinder 10. However, the suspension according to an aspect of the present invention may not include the sub-tank 60.

Also, the suspension according to an aspect of the present invention may not include the damping force generation unit 50. In this case, for example, an automatic two-wheeled vehicle including the suspension may include a damper configured to generate a damping force, as a separate device from the suspensions 1, 2. Also, in this case, the operating oil is not necessarily filled in the cylinder 10 provided to the suspensions 1, 2.

The suspensions 1, 2 are configured to buffer the shock by the reactive force from the air chamber 41 formed by the first diaphragm 40. However, the suspension according to an aspect of the present invention may not include the first diaphragm 40, and may be configured to buffer the shock by a reactive force of a coil spring, for example.

Also, in the suspensions 1, 2, the cylinder 10 has the double tube structure of the outer tube 11 and the inner tube 12. However, in the suspension according to an aspect of the present invention, the cylinder 10 may have a single tube structure.

The present invention is not limited to the respective exemplary embodiments, and can be diversely changed within the scope of the claims. An exemplary embodiment implemented by an appropriate combination of the technical means disclosed in the different exemplary embodiments is also included in the technical scope of the present invention.

REFERENCE SIGNS LIST

1, 2: suspension
10, 10A: cylinder
20: piston rod
21: piston
30: outer tube part
40: first diaphragm (diaphragm)
40*a*: one end
40*b*: other end
41: air chamber
50: damping force generation unit (damping force generation device)
60: sub-tank
70: second diaphragm (rolling diaphragm)
70*a*: one end
70*b*: other end
80: third diaphragm (rolling diaphragm)
80*a*: one end
80*b*: other end

What is claimed is:

1. A suspension comprising:
    a cylinder;
    a piston rod including a piston provided at one end-side, and inserted in the cylinder together with the piston;
    an outer tube part opened at the one end-side, a position of which relative to the piston rod is fixed at the other end-side, and configured to receive therein at least a part of the cylinder; and
    a tubular rolling diaphragm having one end disposed at the cylinder and the other end fixed to the outer tube part, and configured to roll in conjunction with displacement of the piston rod with respect to the cylinder; and
    a diaphragm having one end fixed to the cylinder and the other end fixed to the other end-side of the suspension, and configured to form an air chamber around at least the piston rod,
    wherein the rolling diaphragm becomes convex toward the other end-side of the outer tube part and is accommodated in the outer tube part, upon contraction of the suspension, and
    wherein the diaphragm is disposed in the outer tube part.

2. The suspension according to claim 1,
    wherein the rolling diaphragm includes a material with heat dissipation.

3. The suspension according to claim 2,
    wherein the one end of the rolling diaphragm is disposed to be displaceable with respect to the cylinder.

4. The suspension according to claim 2,
    wherein a pressure in a space surrounded by the outer tube part, the rolling diaphragm, the diaphragm and the cylinder is a negative pressure.

5. The suspension according to claim 2,
    wherein a heat transfer fluid is injected in a space between the rolling diaphragm and the diaphragm.

6. The suspension according to claim 1,
    wherein a heat transfer fluid is injected in a space between the rolling diaphragm and the diaphragm.

7. The suspension according to claim 1,
    wherein a pressure in a space surrounded by the outer tube part, the rolling diaphragm, the diaphragm and the cylinder is a negative pressure.

8. The suspension according to claim 1,
    wherein operating oil is filled in the cylinder, and the suspension further comprises: a damping force generation device configured to generate a damping force with flow of the operating oil.

9. The suspension according to claim 8, further comprising:
    a sub-tank configured to compensate for the operating oil equivalent to an amount of change in volume of the cylinder, which is caused in conjunction with displacement of the piston rod with respect to the cylinder.

10. The suspension according to claim 1,
    wherein the one end of the rolling diaphragm is disposed to be displaceable with respect to the cylinder.

11. A suspension comprising:
    a cylinder;
    a piston rod including a piston provided at one end-side, and inserted in the cylinder together with the piston;
    an outer tube part opened at the one end-side, a position of which relative to the piston rod is fixed at the other end-side, and configured to receive therein at least a part of the cylinder; and
    a tubular rolling diaphragm having one end disposed at the cylinder and the other end fixed to the outer tube part, and configured to roll in conjunction with displacement of the piston rod with respect to the cylinder,
    wherein the rolling diaphragm becomes convex toward the other end-side of the outer tube part and is accommodated in the outer tube part, upon contraction of the suspension, and
    wherein the one end of the rolling diaphragm is disposed to be displaceable with respect to the cylinder.

12. A suspension comprising:
    a cylinder;
    a piston rod including a piston provided at one end-side, and inserted in the cylinder together with the piston;
    an outer tube part opened at the one end-side, a position of which relative to the piston rod is fixed at the other end-side, and configured to receive therein at least a part of the cylinder; and
    a tubular rolling diaphragm having one end disposed at the cylinder and the other end fixed to the outer tube part, and configured to roll in conjunction with displacement of the piston rod with respect to the cylinder,
    wherein the rolling diaphragm becomes convex toward the other end-side of the outer tube part and is accommodated in the outer tube part, upon contraction of the suspension,
    wherein the rolling diaphragm includes a material with heat dissipation, and
    wherein the one end of the rolling diaphragm is disposed to be displaceable with respect to the cylinder.

* * * * *